United States Patent [19]

Parker et al.

[11] Patent Number: 5,404,723
[45] Date of Patent: Apr. 11, 1995

[54] FLUID ABSORPTION RECEIVER FOR SOLAR RADIATION TO POWER A STIRLING CYCLE ENGINE

[75] Inventors: Robin Z. Parker, Miami, Fla.; Peter W. Langhoff, Bloomington, Ind.

[73] Assignee: Solar Reactor Technologies, Inc., Miami, Fla.

[21] Appl. No.: 115,744

[22] Filed: Sep. 2, 1993

Related U.S. Application Data

[60] Continuation-in-part of Ser. No. 976,419, Nov. 13, 1992, Pat. No. 5,241,824, which is a division of Ser. No. 668,202, Mar. 12, 1991, Pat. No. 5,182,912.

[51] Int. Cl.⁶ .............................................. F03G 6/00
[52] U.S. Cl. ..................... 60/641.15; 60/517; 126/654
[58] Field of Search ............... 60/517, 641.8, 641.15, 60/641.14, 649, 673; 126/652, 653, 654

[56] References Cited

U.S. PATENT DOCUMENTS

| | | | |
|---|---|---|---|
| 4,233,957 | 11/1980 | Kenny | 126/652 |
| 4,452,233 | 6/1984 | Goodman, Jr. et al. | 126/653 |
| 4,554,908 | 11/1985 | Hanlet et al. | 126/652 |
| 4,848,087 | 7/1989 | Parker et al. | 60/641.15 |
| 4,945,731 | 8/1990 | Parker et al. | 60/641.15 |
| 5,182,912 | 2/1993 | Parker et al. | 60/641.15 X |
| 5,228,293 | 7/1993 | Vitale | 60/517 X |
| 5,241,824 | 9/1993 | Parker et al. | 60/641.15 X |
| 5,247,796 | 9/1993 | Parker et al. | 60/641.15 X |

Primary Examiner—Stephen F. Husar
Attorney, Agent, or Firm—Cushman Darby & Cushman

[57] ABSTRACT

Disclosed are apparatus and methods used to preheat a working fluid for a subsequent solar-driven dissociation reaction. The working fluid is first passed through a blackbody receiver where it absorbs thermal energy, and is subsequently exposed to direct solar radiation. The present invention allows the working fluid to absorb relatively large amounts of solar energy at elevated temperatures, while the blackbody absorber remains at a relatively low temperature, thus minimizing energy losses through reradiation and enhancing the efficiency of the overall energy exchange. Also disclosed is a non-driven-flow fluid absorption receiver for preferred use with a Stirling engine incorporating absorption of infrared radiation.

9 Claims, 18 Drawing Sheets

FLUID ABSORPTION RECEIVER FOR SOLAR RADIATION TO POWER A STIRLING CYCLE ENGINE

RELATED APPLICATIONS

This application is a continuation-in-part of application Ser. No. 07/976,419, filed Nov. 13, 1992, now U.S. Pat. No. 5,241,824, issued Sep. 7, 1993, which in turn was a divisional of application Ser. No. 07/668,202, filed Mar. 12, 1991, now U.S. Pat. No. 5,182,912, issued Feb. 2, 1993.

BACKGROUND OF THE INVENTION

1. Field of the Invention

The present invention relates generally to apparatus for receiving and using the energy present in solar radiation. The invention relates more specifically to apparatus used to preheat a working fluid for subsequent solar reaction, and to apparatus used for efficient solar absorption in the absence of driven unforced fluid flow.

2. Description of the Related Art

It is well known to utilize blackbody devices for the absorption of solar energy. In order to create a solar absorption device that is economically feasible, many different collector arrangements and working fluids have been proposed. For example, U.S. Pat. No. 3,987,781 to Nozik discloses the use of a blackbody receiver surrounded by a transparent shell that is coated with cadmium stannate. The object of the invention is to transmit solar radiation and reradiate infrared radiation back into the receiver.

By virtue of this construction, the invention disclosed by Nozik allows the blackbody to absorb the solar radiation through the transparent shell, while somewhat alleviating the problem of reradiation from the blackbody to the surrounding atmosphere. It is important to note that this invention, and other prior art devices, provide for energy absorption in but a single stage.

Even with the use of a radiation-selective surface, reradiation is a problem at high working temperatures with conventional solar absorption receivers. Such is the case because the blackbody must become very hot in order to heat the working fluid to the desired temperature. The blackbody will then radiate large amounts of energy to any surface that is at a lower temperature than itself. The energy transferred, or lost, through reradiation is proportional to the temperature difference between the blackbody and any surrounding surfaces. Thus, the higher the blackbody temperature, the greater the losses that may be attributed to reradiation.

Although conventional blackbody and other direct absorption receivers are satisfactory in certain respects, there are inherent limitations on the use of surface absorption of solar radiation to drive external heat engines. Specifically, the receiver cavity in such systems generally operates at a higher temperature than the working fluid driving the external heat engine, since a gradient is required to achieve the heat transfer from absorbing surface to working fluid. The efficiency of a blackbody or direct absorption receiver decreases with increasing temperatures due to reradiation in the infrared. Consequently, the increase in efficiency of the associated heat engine achieved at higher operating temperatures is ultimately offset or lost entirely in the system combination.

In addition, difficulties with absorbing-surface thermal stress can arise in the presence of high temperatures and high light fluxes in conventional blackbody or direct absorption receivers, providing a serious limitation on the capability of such devices at elevated power levels.

Inventions that have as their objects the generation of electrical power through the absorption of solar radiation and subsequent dissociation of the halogen constituents of a working fluid include U.S. Pat. Nos. 4,848,087 and 4,945,731.

U.S. Pat. No. 4,848,087 entitled "Solar Augmented Power System" discloses an energy conversion system in which a focused beam of radiation is employed to induce a reactive substance to produce reaction products at elevated temperatures and pressures. The pressurized materials are then controllably exhausted and introduced into a means for converting the heat and pressure of the pressurized materials into other useful work.

U.S. Pat. No. 4,945,731 entitled "Absorbing Fluid Receiver for Solar Dynamic Power Generation and Solar Dynamic Power System" discloses a receiver for a solar dynamic power system. The receiver has a hollow, cylindrical containment with a window for admitting solar radiation in the receiving space to heat a working fluid. The working fluid comprises a radiant energy absorber selected from halogens and interhalogens. Means are provided for coupling the working fluid with a heat engine for the purpose of generating electrical power.

SUMMARY OF THE INVENTION

It is an object of this invention to provide apparatus for more efficiently recovering the thermal, visible, and ultraviolet energy present in solar radiation.

It is an additional object of the present invention to provide an apparatus for preheating a working fluid for a subsequent solar dissociation reaction.

Further, it is an object of the present invention to provide an apparatus wherein the blackbody absorber is maintained at a relatively low temperature in order to minimize reradiation to the surrounding atmosphere.

It is an additional object of the present invention to provide an apparatus for efficient solar energy absorption and conversion in the absence of fluid flow.

The preferred embodiment of this invention will be described in connection with a Stirling engine system.

Accordingly, the present invention provides an apparatus for preheating a working fluid prior to its direct exposure to solar radiation. The present invention will be described below in conjunction with two preferred embodiments. The first preferred embodiment has an optically transparent shell completely surrounding a blackbody absorber which is used for preheating. In the second preferred embodiment, the optically transparent shell only partially surrounds the blackbody portion, and is semicircular when viewed in cross section. For this reason, the second preferred embodiment is well suited to retrofit applications of existing fluid absorption receivers.

A fluid absorption receiver employing a light-absorbing fluid and an appropriate window configuration provides an alternative to direct absorption or conventional blackbody receivers, and affords a number of distinct advantages. Specifically, since the surfaces in the fluid absorption receiver can operate at temperatures lower than the light-absorbing fluid flowing through it, higher operating temperatures are achieved than in the more conventional design. The optimum selected high temperature fluid does not itself reradiate in the infrared, so cavity heat loss is kept to a minimum. Additionally, thermal energy loss from the fluid is minimized by the low rate of gas-to-surface heat transfer.

In both embodiments, the working fluid first passes through the blackbody receiver, absorbing thermal energy therefrom, then passes through the optically transparent portion for direct exposure to visible and ultraviolet solar radiation. This novel feature of the present invention allows the working fluid to absorb relatively large amounts of solar energy while the blackbody absorber remains at a relatively low temperature, thus minimizing energy losses through reradiation.

The embodiment of this invention to improve a non-driven-fluid absorption receiver for solar radiation used to power a Stirling cycle engine is described below.

In each embodiment, the direct absorption of visible and ultraviolet solar radiation is used to dissociate the halogen components of a working fluid. The advantage of the present system is that it operates efficiently at a relatively low receiver temperature. Consequently, a rather conservative concentration ratio of approximately 100 may be employed, thus eliminating the need for either an advanced reflector and optics design, or a precision pointing system. In addition, the relatively high temperature of the working fluid with minimal reradiation loss makes the invention compatible with advanced power conversion systems such as Stirling or Brayton cycle engines.

BRIEF DESCRIPTION OF THE DRAWINGS

Other objects, features, and advantages of the present invention will become more fully apparent from the following detailed description of the preferred embodiments, the appended claims, and the accompanying drawings. As depicted in the attached drawings:

DESCRIPTION OF THE PREFERRED EMBODIMENTS

The present invention will be discussed in terms of the currently perceived preferred embodiments thereof.

By way of example, the present invention will be described in connection with halogens, interhalogens, and an inert gas.

A fundamental aspect of the present invention is the dissociation of halogen molecules contained in a working fluid. When halogen molecules are exposed to sunlight, a portion of the incident radiation dissociates the diatomic molecules in the reaction:

$$X_2 + photon \rightarrow 2X$$

where X represents a halogen molecule. Since the photon energy absorbed is very high on a molar basis, the potential exists for significant gas heating when the energy is released upon recombination.

The reaction is carried out in the presence of a buffer gas to ensure efficient transfer of the chemical energy stored in the dissociated atoms into thermal energy without reradiation.

Figure 1:
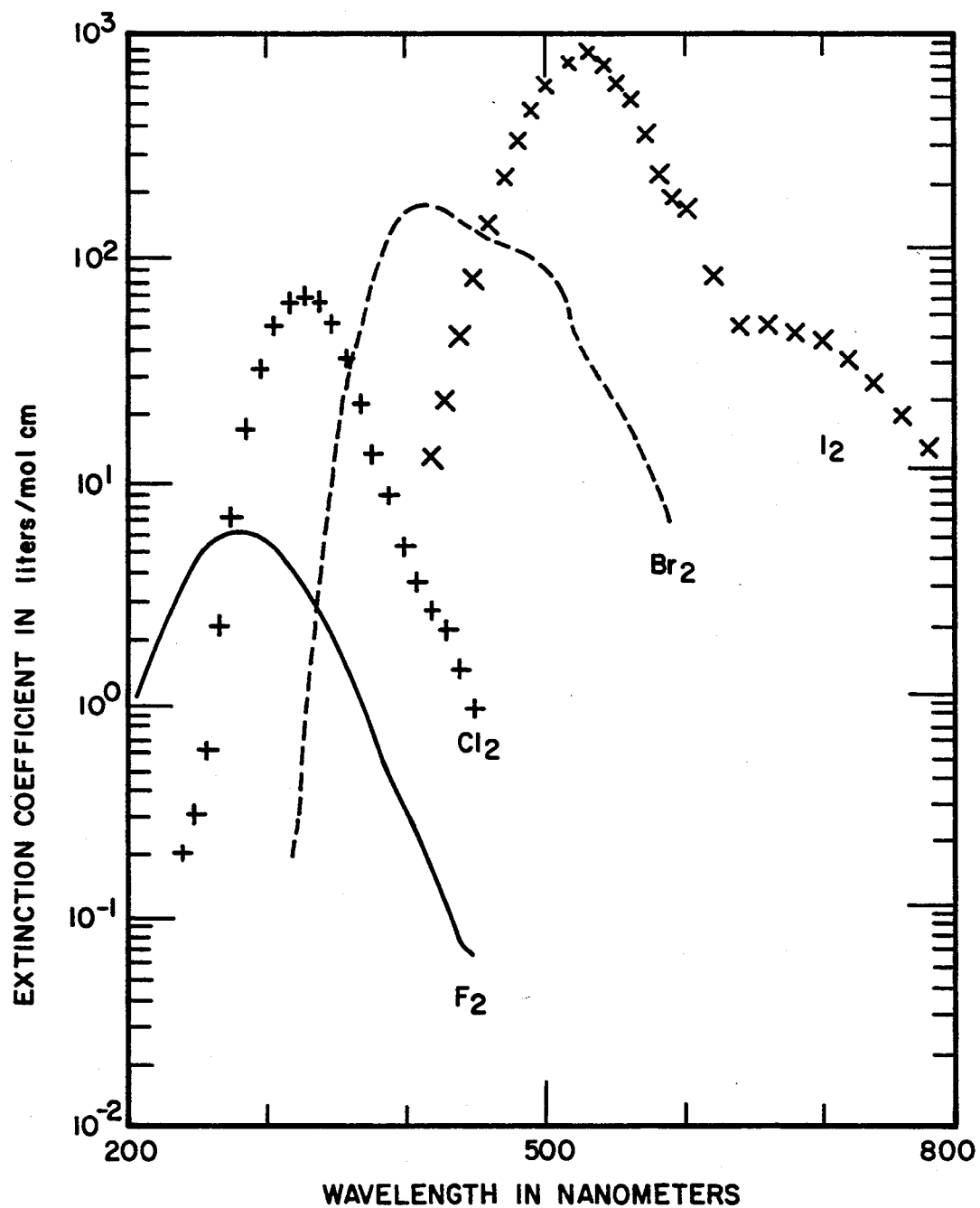
FIG. 1 shows the absorption spectra of simple dihalogens of interest at room temperature.

The working fluid is a mixture of halogens such as $Cl_2$, $Br_2$, and I in an inert buffer gas such as argon or helium. The working fluid flows through a receiver through which concentrated sunlight enters. In the receiver, the ultraviolet and visible portions of the solar spectrum are absorbed very efficiently by the halogens, which then transfer that energy, via collisions, to the buffer gas. FIG. 1 shows the absorption spectra of the halogens of interest.

Figure 2:
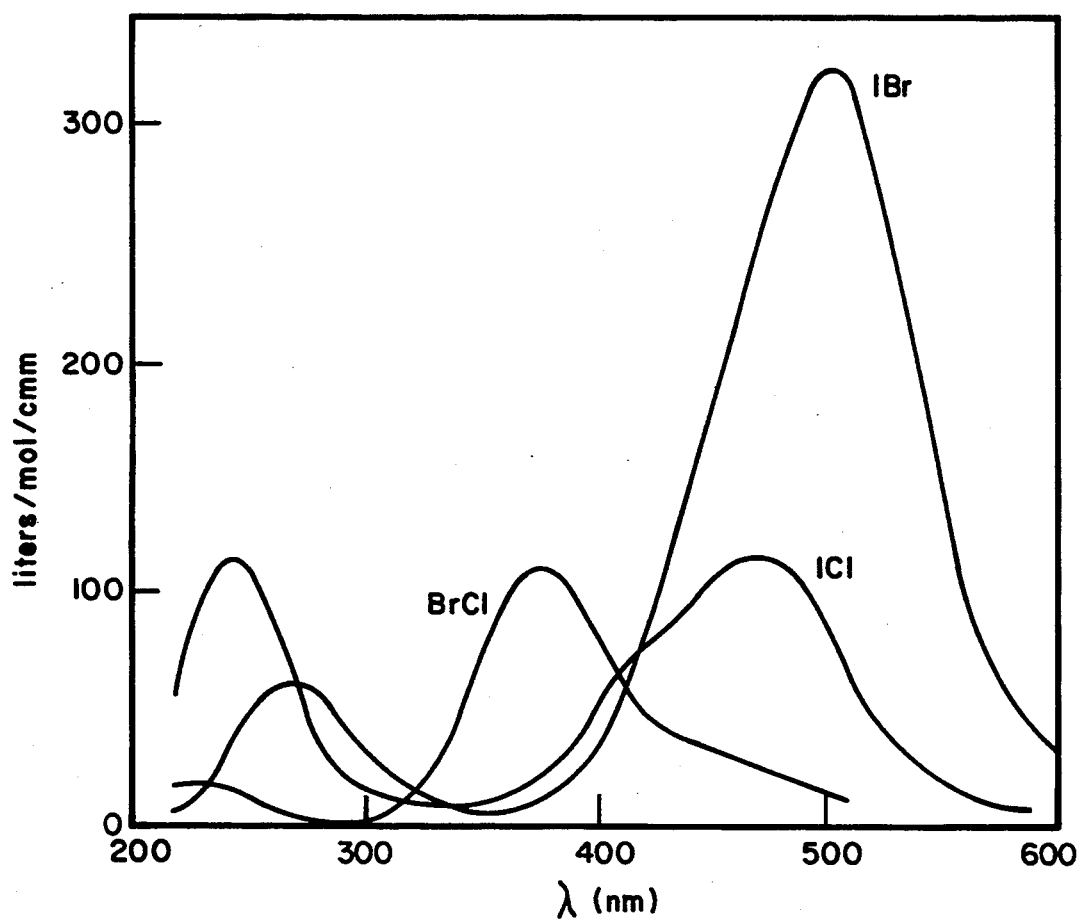
FIG. 2 shows the absorption spectra of inter-halogens of interest at room temperature.
Figure 3:
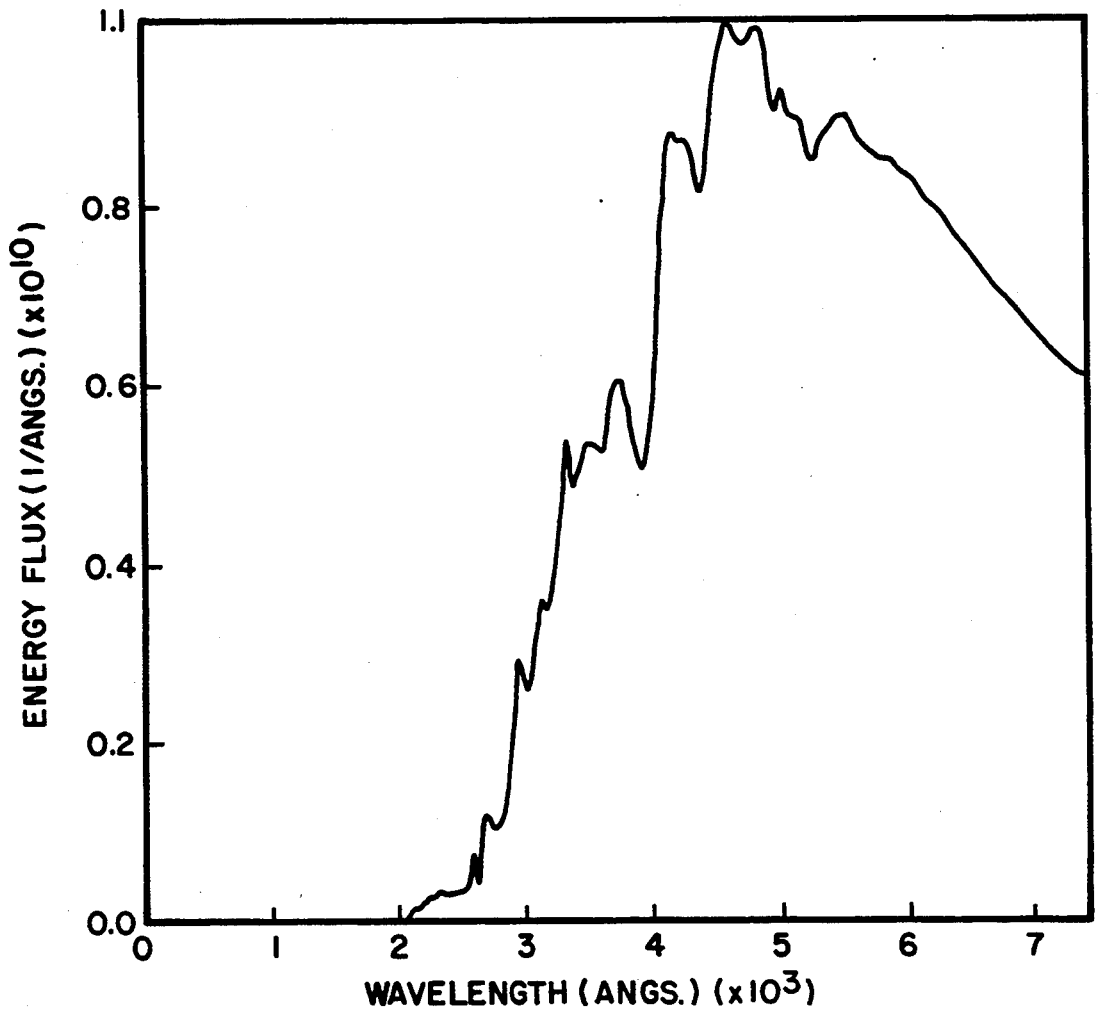
FIG. 3 depicts the solar spectrum.
Figure 4:
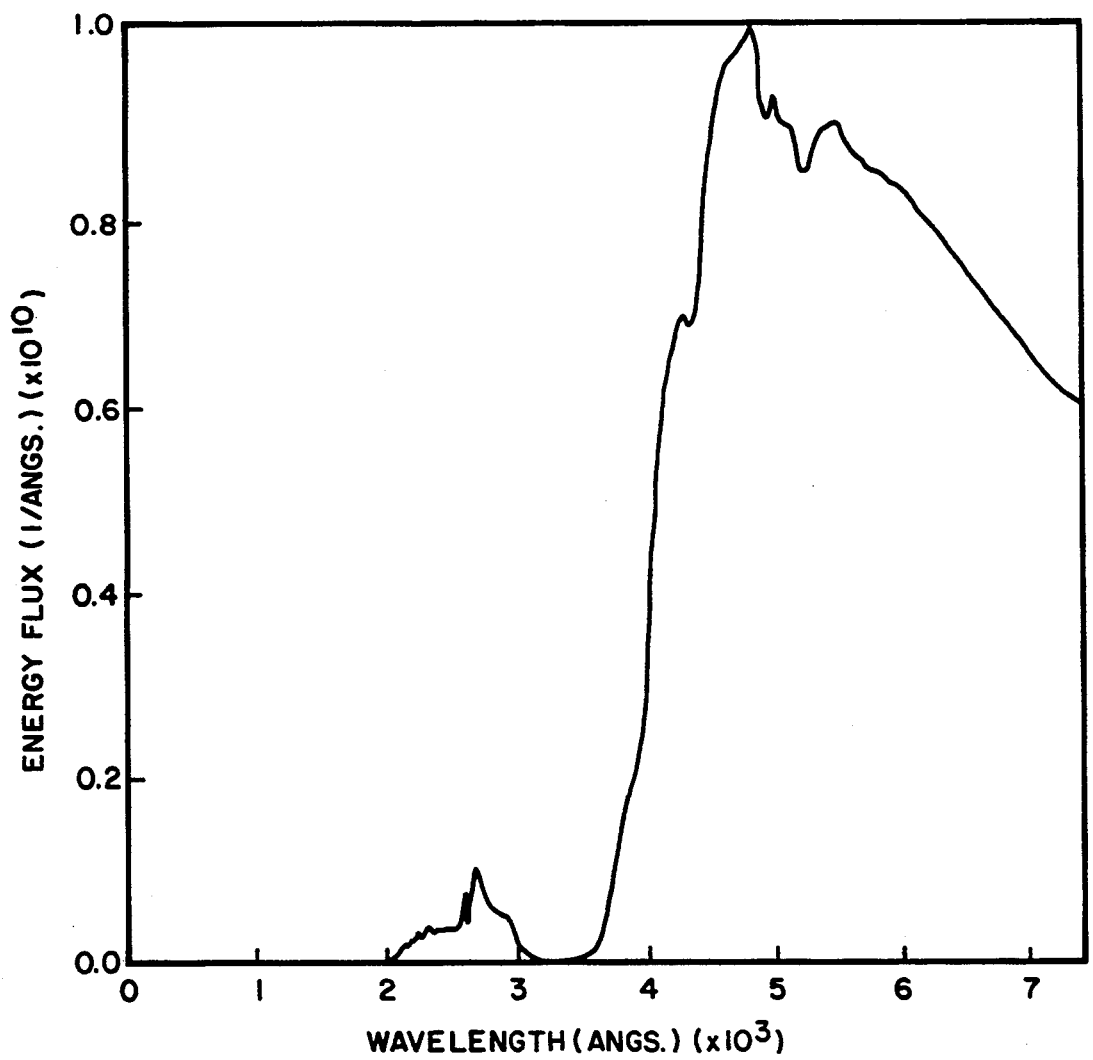
FIGS. 4–6 depict the portion of the spectrum passing through three 1 cm deep cells containing $Cl_2$, $Br_2$, and $I_2$ at atmospheric pressure and room temperature.
Figure 5:
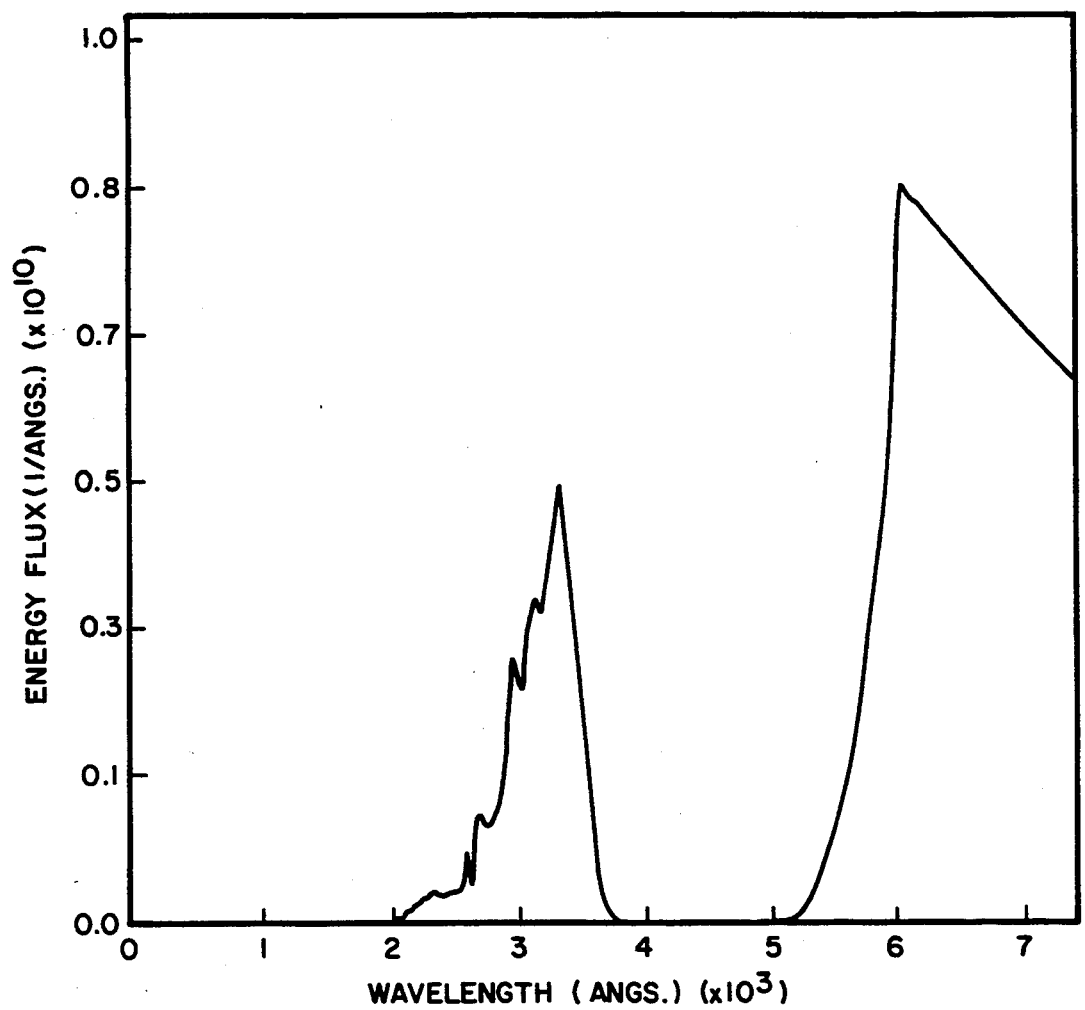
Figure 6:
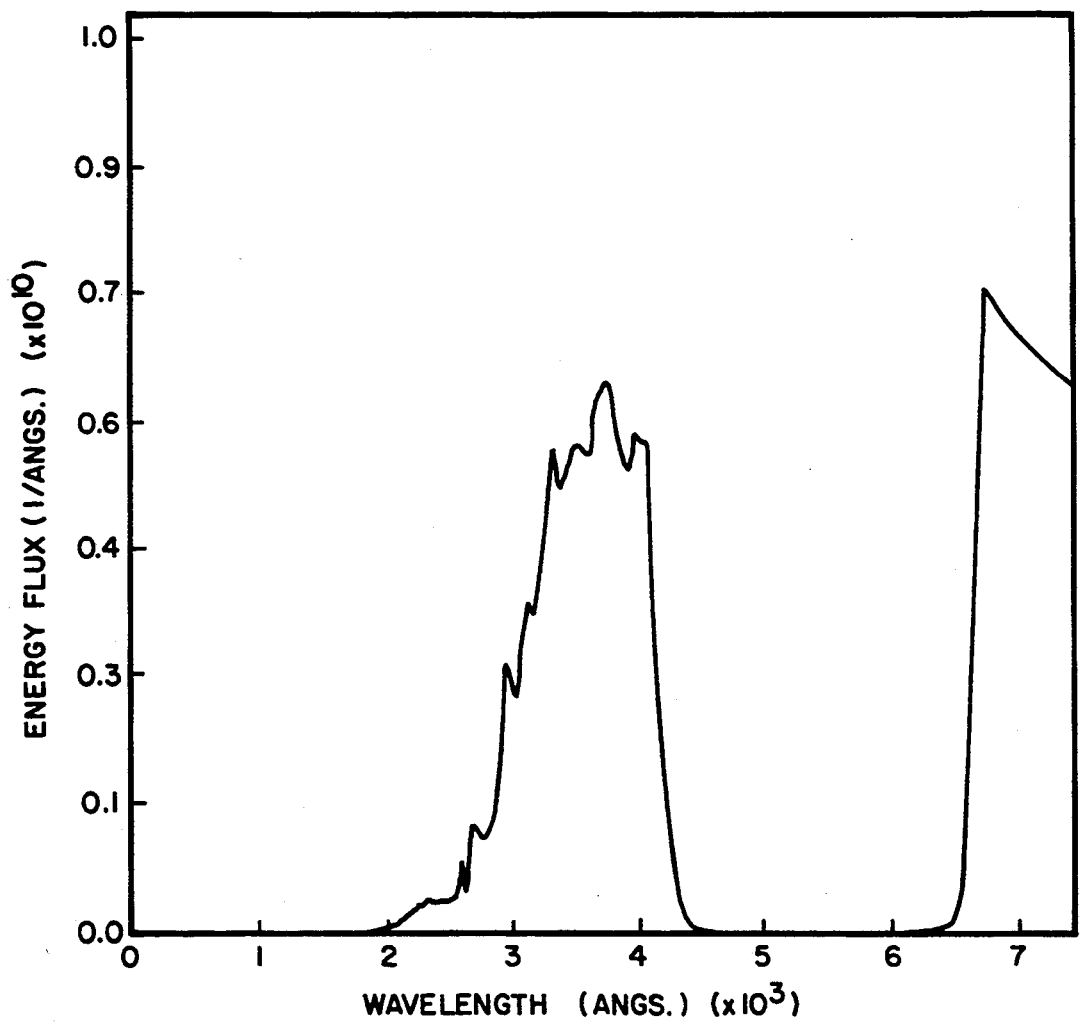

Halogen dissociation and the possible resultant formation of interhalogens such as IBr, ICl or BrCl may have an effect on the thermodynamic efficiency of the cycle. The interhalogens also absorb the UV and visible portion of the spectrum, however, so their formation may not necessarily degrade performance (FIG. 2).

The buffer gas, which is a monatomic gas, does not reradiate in the infrared, nor do the halogens. The infrared portion of the solar spectrum is not absorbed by the halogen working fluid and thus penetrates through the receiver cavity. A method of recovering this remaining energy is discussed later. The solar spectrum and the portion of the spectrum passing through three 1 cm deep cells containing $Cl_2$, $Br_2$, and $I_2$ are shown in FIGS. 3 through 6 respectively.

These figures indicate a strong match between the solar spectrum and the absorption spectra of the halogens; this is the basis of the present invention. By proper selection of the working fluid mixture composition, it is possible to maximize the absorption of solar energy. Moreover, thermodynamic considerations indicate that temperatures on the order of 1700° C. are achievable. The limiting temperature is determined by the dissociation of the molecular halogen. The first significant dissociation of iodine occurs at a temperature of approximately 1400° C.; chlorine and bromine begin to dissociate at an even higher temperature.

Figure 7:
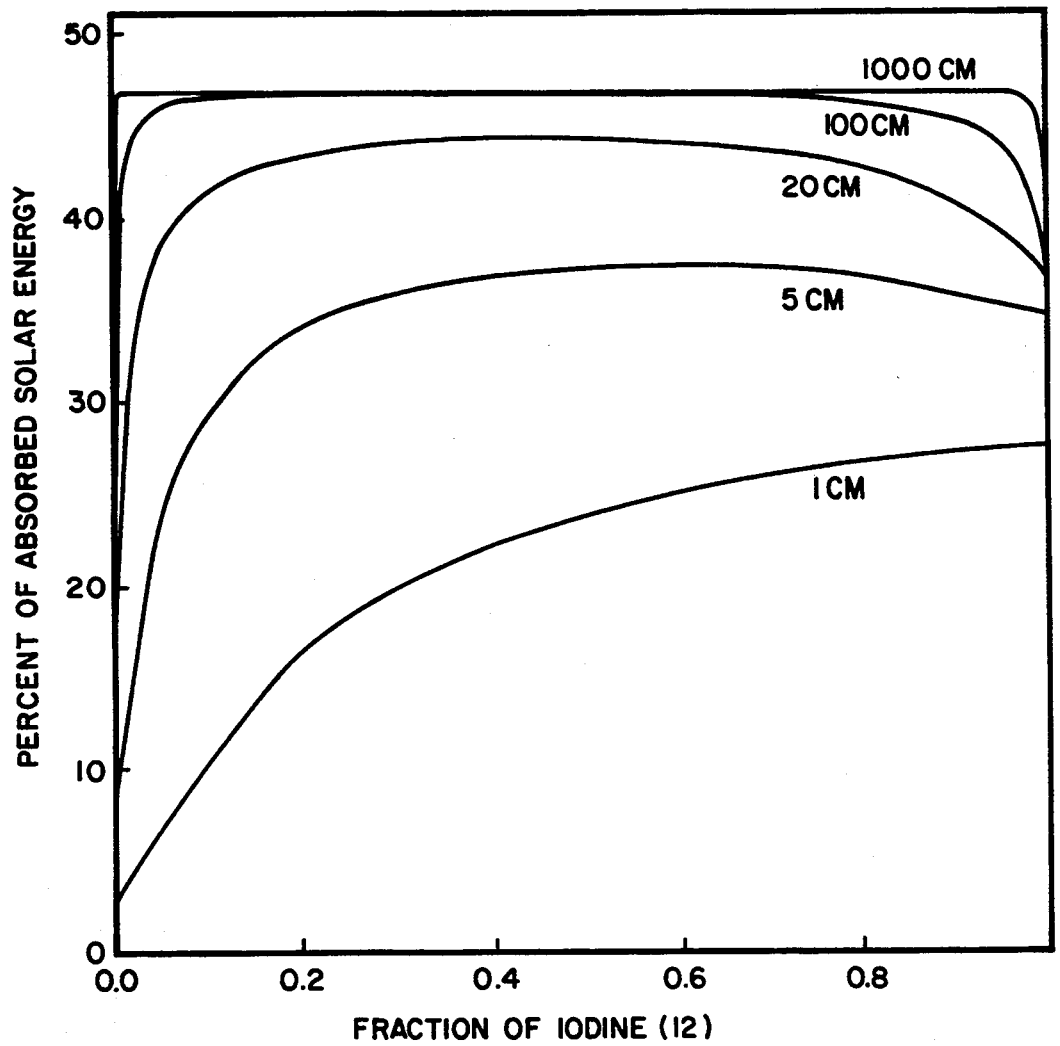
FIGS. 7 and 8 depict the total absorption, including all wavelengths, of solar energy through two binary mixtures of $Cl_2/I_2$ and $I_2/Br_2$ at atmospheric pressure and room temperature.
Figure 8:
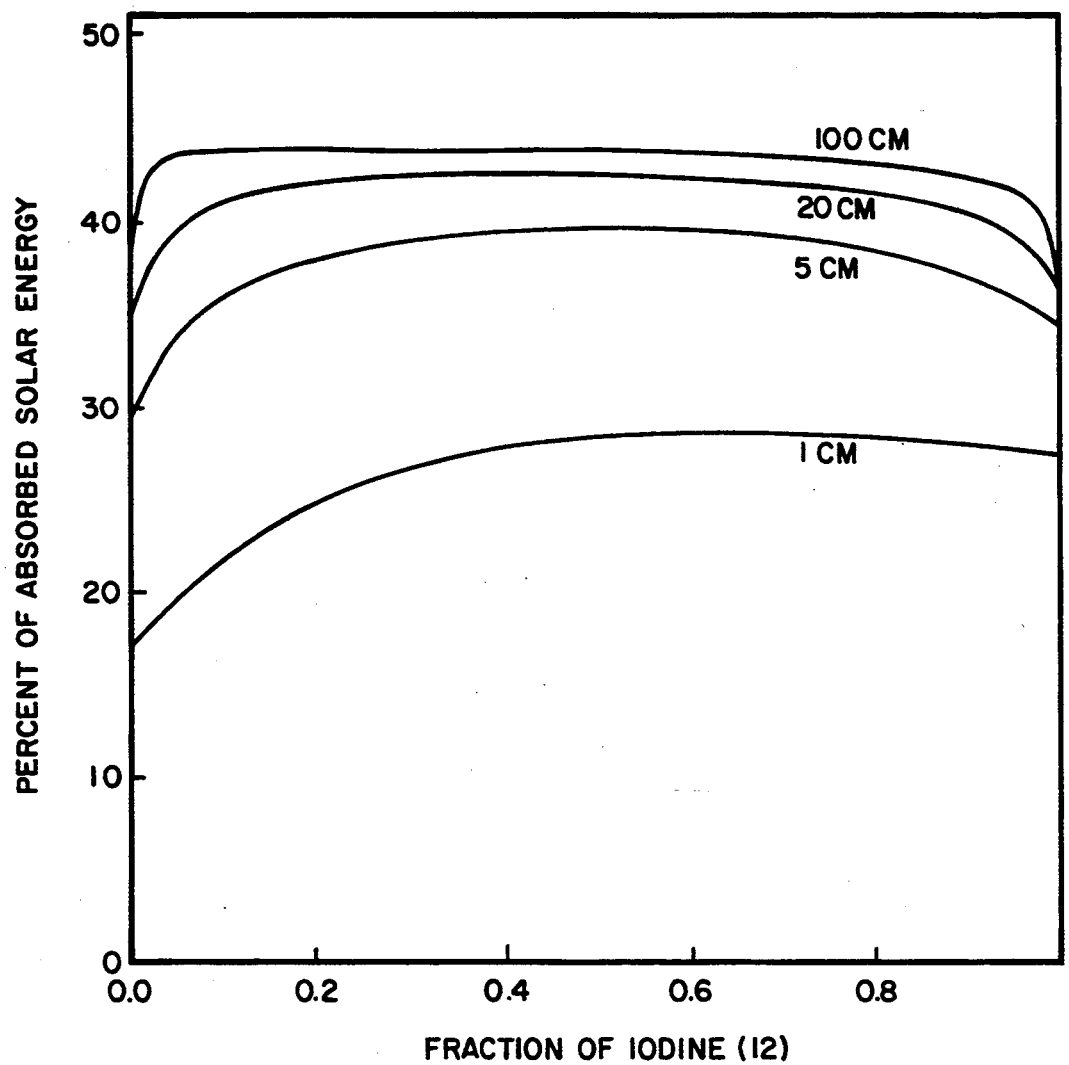

The absorption of solar energy through two binary mixtures of $Cl_2/I_2$ and $I_2/Br_2$ is shown in FIGS. 7 and 8. These figures indicate that an appropriate combination of gases can be used to optimize the absorption. The ideal composition would be one which maximizes the absorption of the visible portion of the spectrum. It currently appears that a mixture comprising $Ar/Br_2/I_2/Cl_2$ in the volumetric proportions of 0.75/0.1/0.1/0.05 yields nearly optimum results.

Figure 9:
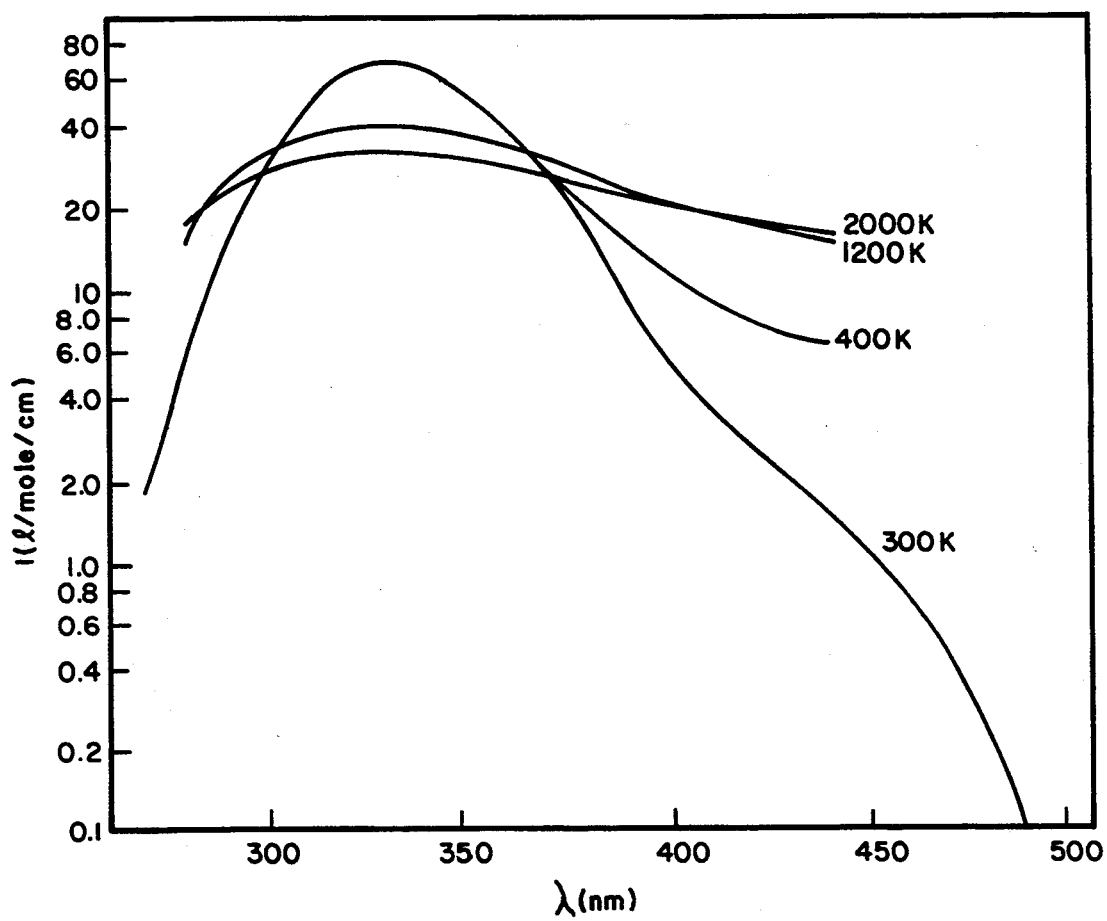
FIG. 9 shows the spectral broadening that occurs for chlorine at high temperatures and pressures.

The spectral absorption at high temperatures and pressures indicate that as the temperature increases, the absorption band widens, but the peak tends to be lower. FIG. 9 illustrates the spectral broadening that occurs for chlorine.

As previously noted, the halogens absorb only the visible and ultraviolet portions of the solar spectrum (below about 750 nm). Table 1 shows the percent of the solar spectrum that is at wavelengths shorter than a given wavelength (lambda). The table also shows that about 50% of the solar energy is above 750 nm.

TABLE 1

Percent of Solar Constant at Wavelength Shorter Than Lambda.

| $\lambda, \mu m$ | $D(0-\lambda)$ | $\lambda, \mu m$ | $D(0-\lambda)$ | $\lambda, \mu m$ | $D(0-\lambda)$ |
|---|---|---|---|---|---|
| 0.12 | 0.00044 | 0.550 | 29.380 | 1.000 | 69.488 |
| 0.20 | 0.00811 | 0.575 | 32.541 | 1.100 | 74.435 |
| 0.25 | 0.1944 | 0.600 | 35.683 | 1.200 | 78.404 |
| 0.28 | 0.5644 | 0.630 | 39.270 | 1.400 | 84.331 |
| 0.30 | 1.2107 | 0.650 | 41.550 | 1.500 | 86.639 |
| 0.35 | 4.517 | 0.700 | 46.879 | 1.700 | 90.261 |
| 0.40 | 8.725 | 0.750 | 51.691 | 1.900 | 92.644 |
| 0.45 | 15.14 | 0.800 | 56.023 | 2.500 | 96.290 |
| 0.475 | 18.921 | 0.850 | 59.899 | 4.000 | 99.058 |
| 0.500 | 22.599 | 0.900 | 63.365 | 5.000 | 99.511 |
| 0.525 | 26.059 | 0.950 | 66.556 | 10.000 | 99.937 |

This infrared energy would penetrate through the halogen/buffer working fluid mixture and reach the inner surface of the receiver. Obviously, the overall efficiency of such a system could be nearly doubled if this energy could be used to heat the halogen/buffer working fluid. The best way to make use of this portion of the transmitted solar flux is to select the material of the inner surface so that it absorbs infrared energy. This energy can then be conducted into the halogen/buffer working fluid by flowing the working fluid through the infrared receiver. The infrared receiver would conduct the thermal energy as a heat exchanger to the working fluid. By using this additional energy, the overall receiver efficiency could be boosted to nearly 100%.

To avoid reradiation loss in the system, the receiver structure in contact with ambient atmosphere, must be maintained at a low temperature. In other words, the receiver cavity must be insulated from the high temperature working fluid. This can be accomplished by surrounding the receiver in a transparent vacuum jacket. This material is selected based on its transmission spectra and operating temperature. The candidate materials include various glasses, fused silica and crystalline quartz. The transmission properties are all over 90% and remain flat from the near UV to over 2.3 um. The maximum service temperature for each is higher than 800° C.

The fact that the halogen fluid directly absorbs the solar energy without reradiating it is the major advantage of the present system, compared with conventional solar receivers in which reradiation loss is a limiting factor in the operating efficiency of the collector. This advantage also leads to several other important attributes.

First, because of the receiver structure's low operating temperature, there is no need for a small aperture, thus allowing a relatively large window area to be utilized. This in turn translates into a low concentration ratio. A low concentration ratio system is much more forgiving of concentrator surface slope errors and is therefore much easier and much more economical to fabricate.

Second, a low concentration ratio system is also more forgiving of tracking and pointing errors, simplifying the overall requirements of the optical system.

Third, the lack of significant reradiation means that the gas working fluid of the present system can operate at much higher cycle temperatures than can be achieved by conventional systems. This allows higher efficiencies, and a smaller, higher temperature radiator.

Fourth, the present system may also utilize various energy conversion techniques for electrical energy generation. In some systems (closed Brayton or Stirling cycle) the absorbing fluid may serve as the working fluid in the power conversion unit. In another embodiment, a heat exchanger may be utilized to transfer the heat into another working fluid cycle (closed Rankine cycle). Furthermore, the high temperatures obtainable with this system suggests other, possibly more efficient, conversion schemes such as thermo-electric, topped dynamic cycles or even thermionic conversion.

Figure 10:
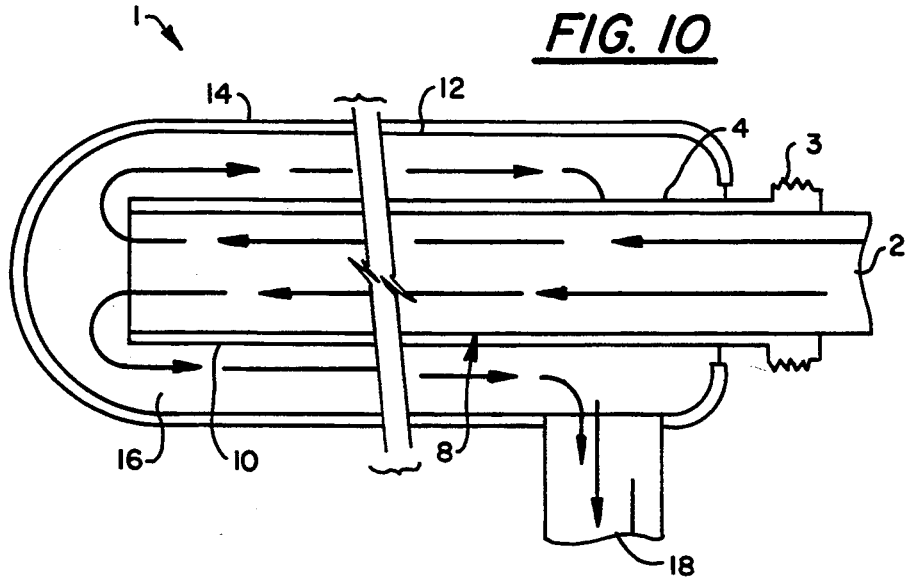
FIG. 10 depicts a double-flow fluid absorption receiver with two vacuum jackets to prevent reradiation losses.
Figure 10A:
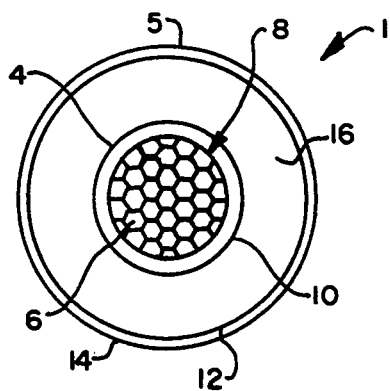
FIG. 10(a) is a cross sectional view of the first preferred embodiment.

FIG. 10 depicts a double-flow fluid absorption receiver with two vacuum jackets to prevent reradiation losses. This design incorporates existing technology: the inner portion is a modification of a state-of-the-art conventional blackbody receiver and a heat exchanger; the outer, optically transparent, quartz portion provides for direct fluid absorption.

In one possible embodiment, the receiver could be coupled with a trough solar collector, energy converter, and a heat rejection system. The receiver may also be utilized vertically around the perimeter of the "hot" section of a power tower which could be located centrally in a heliostat field.

In the first preferred embodiment, the fluid absorption receiver comprises a working fluid comprising a radiant energy absorber selected from the group consisting of halogens and interhalogens, and a buffer gas. The receiver also comprises a hollow, cylindrical containment for containing the working fluid having a first end, and a second end, and a hollow, cylindrical vacuum containment for insulating the cylindrical containment and admitting solar radiation having a first end, a second end, a transparent inner wall, and a transparent outer wall.

Additionally, the receiver comprises a hollow, cylindrical member, disposed within the cylindrical containment, having an inner wall and an outer wall, and defining an annular working fluid flow space comprising heat exchange means within the containment. Surrounding the cylindrical member for the purpose of providing insulation is a hollow, cylindrical vacuum containment having a first end, a second end, and a transparent outer wall. Means are also provided for coupling the heated working fluid with a heat engine.

FIG. 10 illustrates the fluid receiver 1 of the first preferred embodiment of the present invention. The working fluid is introduced into central conduit 4 at inlet 2. A bellows may be included as indicated at 3 to account for thermal expansion. Central conduit 4 contains heat exchanger 6, as depicted in the cross-section of FIG. 10(i a), through which the working fluid flows. Heat is absorbed by blackbody coating 8 on the outside of central conduit 4. This energy is then conducted to the working fluid by means of heat exchanger 6. Central conduit 4 is insulated by means of cylindrical vacuum jacket 10 surrounding central conduit 4. The entire central conduit 4 is surrounded by quartz receiver 12 which is, in turn, insulated by outer vacuum jacket 14.

The preheated working fluid exits the central conduit and enters annular space 16 between central conduit 4 and quartz receiver 12. The working fluid is conducted through annular space 16, directly exposed to visible and ultraviolet radiation and absorbs further energy in a dissociation reaction. Reradiation is prevented by buffering the gas in an inert gas so as to ensure that excited halogen dissociation products are quenched and return to their molecular ground state after undergoing collisions which remove some of the absorbed solar energy. The working fluid exits at outlet 18 and is conducted to a means for coupling the working fluid with a heat engine.

In another embodiment, the outer surface of cylindrical vacuum jacket 10 may have affixed to its surface a baffle oriented in a spiral configuration around the length of its axis. The purpose of the baffle is to prevent laminar flow in annular space 16, thus ensuring that mixing and the associated enhanced heat transfer occurs.

Figure 11:
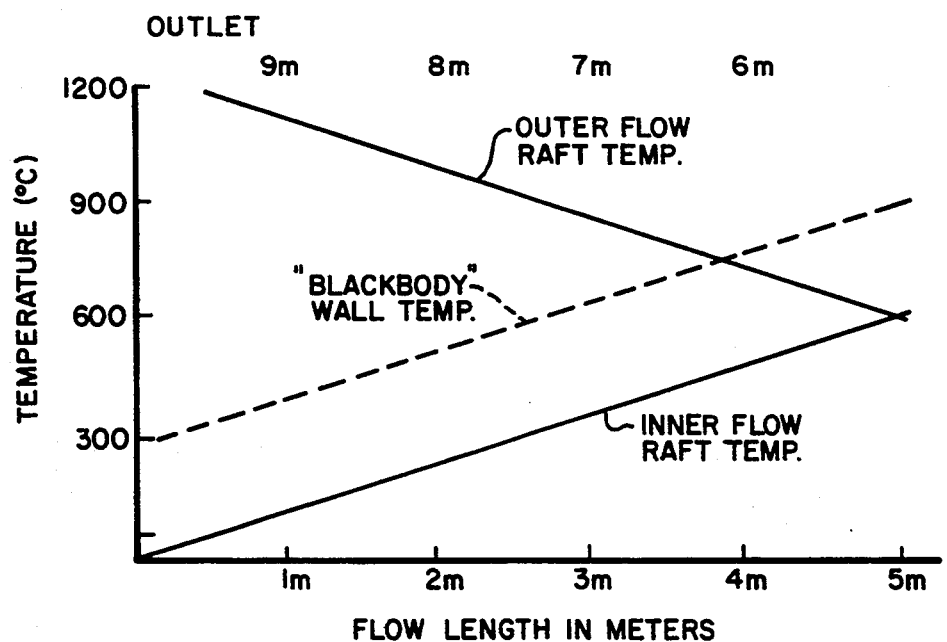
FIG. 11 is a theoretical graph of temperature of the blackbody surfaces and the working fluid as it passes through the receiver of the first preferred embodiment.

FIG. 11 is a graph which depicts the relatively low temperature of blackbody coating 8 with respect to flow of the working fluid through the present invention. By allowing a lower temperature of blackbody coating 8, the present invention limits reradiation losses.

Figure 12:
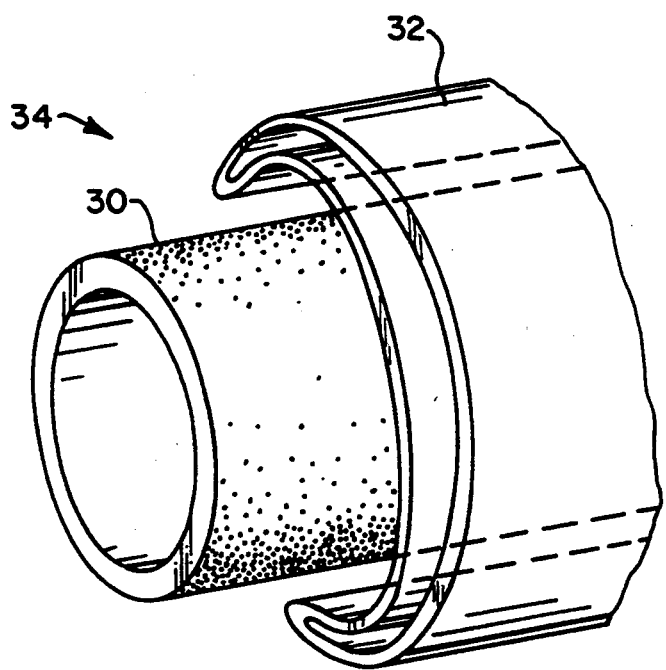
FIG. 12 is perspective view of the second preferred embodiment in partial section.

FIG. 12 illustrates the second preferred embodiment of the present invention. In the second preferred embodiment, the quartz receiver does not completely surround the blackbody and is therefore more suitable for retrofit applications on existing blackbody absorber systems. The optically transparent shell only partially surrounds the blackbody portion, and defines a semicircular containment when viewed in cross section.

In the second preferred embodiment, the fluid absorption receiver comprises a working fluid comprising a radiant energy absorber selected from the group consisting of halogens and interhalogens, and a buffer gas. The receiver also comprises a hollow, semicircular containment for containing the working fluid having a first end and a second end, and a hollow, semicircular vacuum containment for insulating the semicircular containment and admitting solar radiation having a first end, a second end, a transparent inner wall, and a transparent outer wall. Means are also provided for coupling the heated working fluid with a heat engine.

A synthetic oil or similarly suitable fluid is introduced into existing blackbody absorber 30. The outlet (not illustrated) of blackbody absorber 30 is in communication with a conventional heat exchanger. Quartz receiver 32, separated from the blackbody absorber by an air space, contains a working fluid comprising halogens, interhalogens, or mixtures thereof, and a buffer gas.

Figure 13:
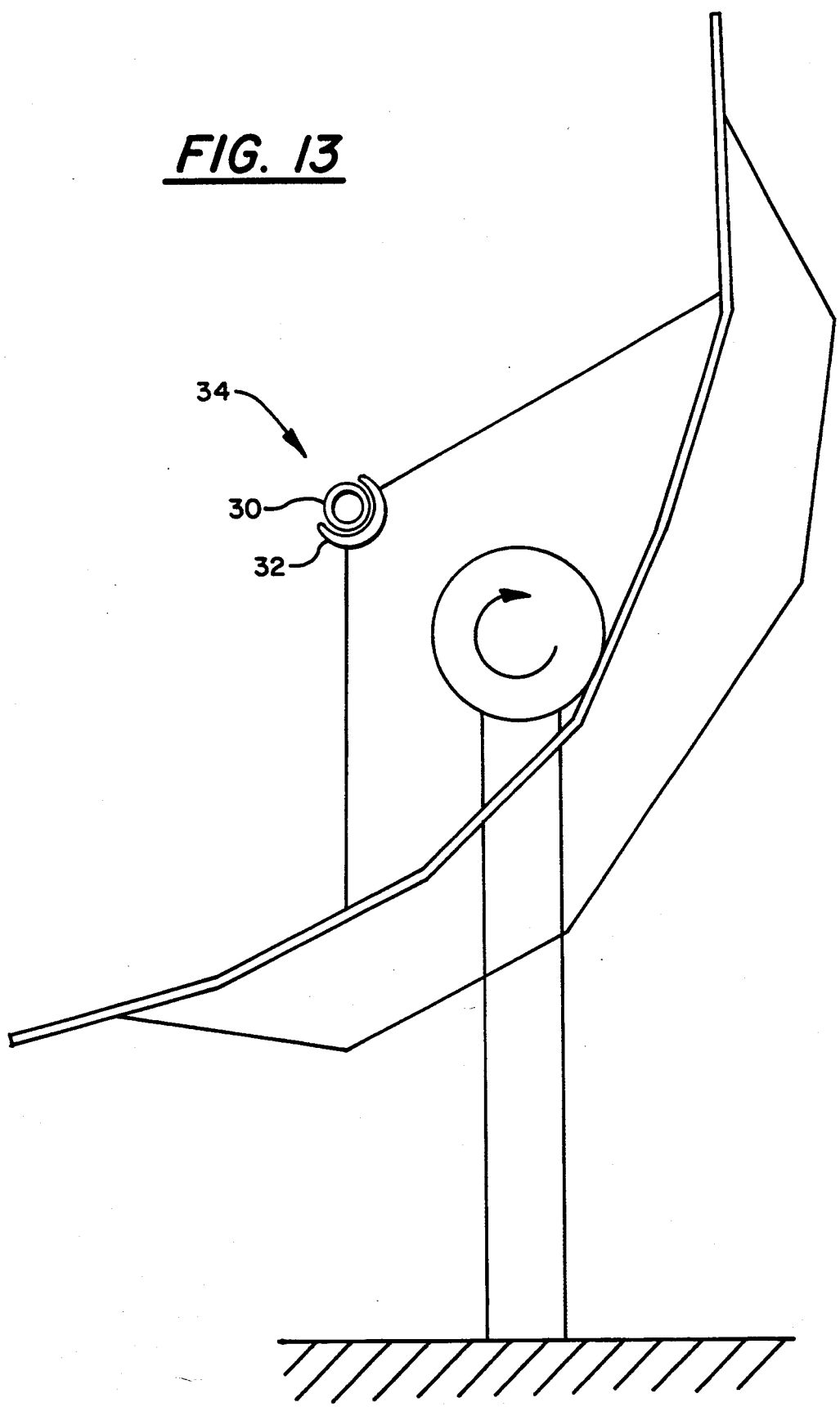
FIG. 13 illustrates how the second preferred embodiment may be situated with respect to an existing solar receiver and reflector.

The second preferred embodiment can utilize vacuum insulation techniques similar to the first preferred embodiment. Also, solar energy may be focused on the invention as disclosed in either preferred embodiment by any appropriate means. For example, light may be focused by a single parabolic reflector (see FIG. 13) or by many reflectors arranged either in proximity to, or at a distance from, the receiver.

In the third preferred embodiment, the present invention may function in a retrofit mode by providing a binary solar field application. In this embodiment, the fluid absorption receiver superheats steam produced from a conventional blackbody receiver, thus reducing, or eliminating, the use of supplemental natural gas.

Figure 14:
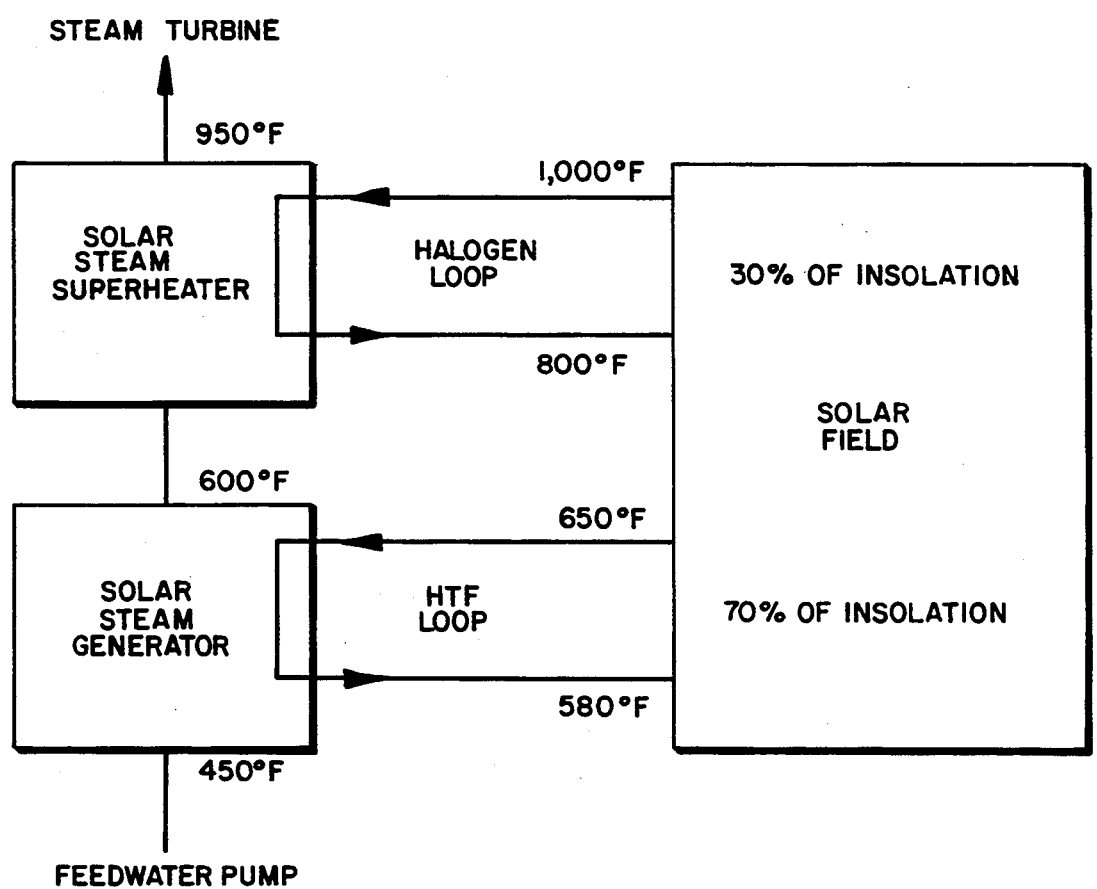
FIG. 14 is a process diagram of a binary solar field concept employing the halogen loop of the present invention.

FIG. 14 depicts a binary solar field concept employing the halogen loop of the present invention. In the first, or conventional high temperature fluid loop of the binary installation, a fluid is heated from 305° C. to 345° C. based on 70% of the insolation in a solar field. The high temperature fluid is heated by means of a conventional blackbody absorber, and then exchanges the recovered heat to raise steam in a steam generator.

In the second loop of the binary solar field embodiment, the halogen or interhalogen/buffer gas working fluid of the present invention is heated from 425° C. to 535° C. based on 30% of the insolation in a solar field. This fluid then exchanges its recovered heat in a steam superheater to superheat the conventionally-generated steam from 315° C. to 510° C. The superheated steam is then utilized in a steam turbine for power generation.

Advantages of the binary field application include lower thermal fluid temperatures and the associated elevation in steam superheat temperatures; elimination of excessive thermal stress; an increase in system operating efficiency; a reduction in natural gas costs; and minimal capital investment.

Figure 15:
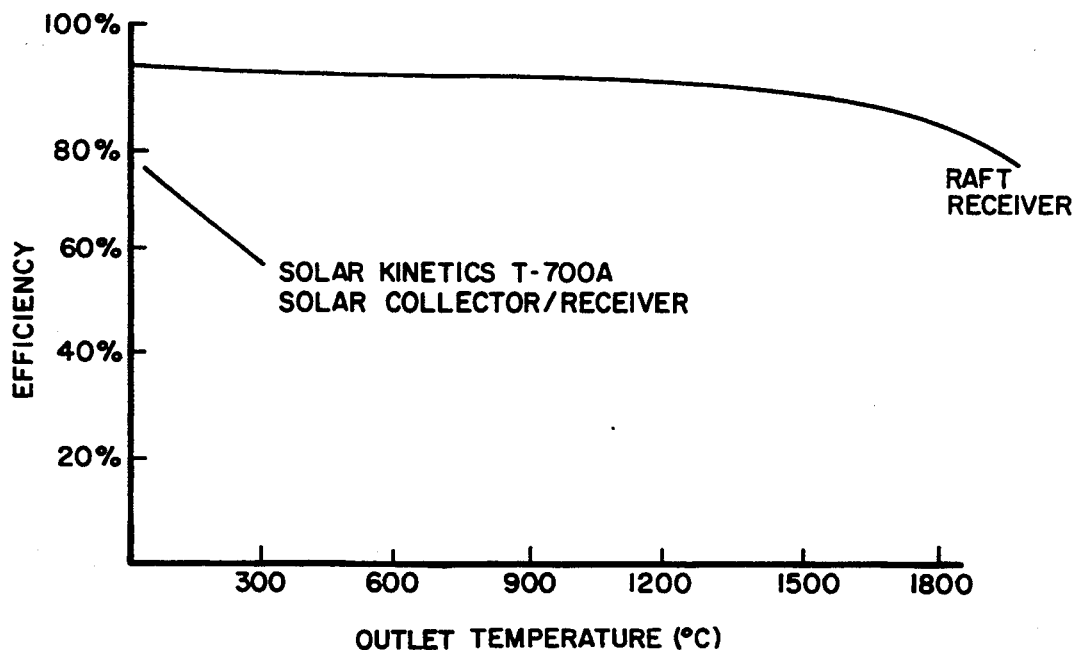
FIG. 15 is a graph illustrating the efficiency of a Solar Kinetics T-700A conventional blackbody absorber as compared with that of the present invention, or RAFT Receiver, at various fluid outlet temperatures.

FIG. 15 is a graph which depicts the efficiency of a Solar Kinetics T-700A conventional blackbody absorber as compared with that of the present invention at various fluid outlet temperatures. The present invention is referred to herein as a "RAFT Receiver, " for Radiation Augmented Fluid Technology Receiver. As the graph illustrates, a blackbody absorber utilizing synthetic oil as working fluid is capable of a maximum efficiency of only 60%, since the oil is thermally unstable, thus limiting the outlet operating temperature to 325° C.

Figure 16:
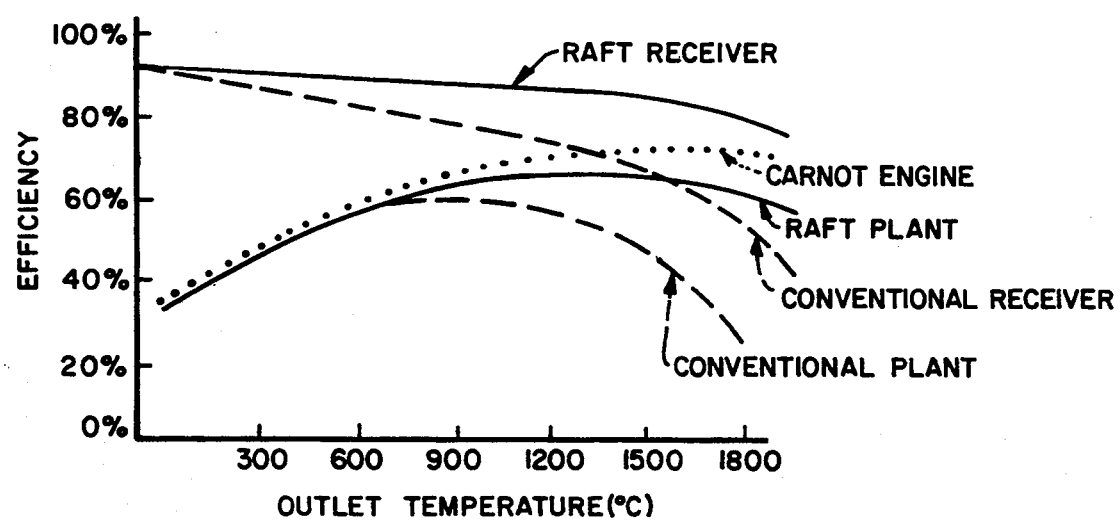
FIG. 16 is a graph illustrating the efficiency of the present invention as compared with conventional devices.

FIG. 16 is a graph which depicts the efficiency of the RAFT Receiver of the present invention as compared with conventional devices. Most importantly, the figure indicates the significance of radiation losses in line-focus receivers. At high operating temperatures, the efficiency of conventional devices drops dramatically as a result of reradiation, even when a selective surface is used. The fluid absorption receiver of the present invention does not exhibit this dramatic drop in efficiency, however, since the blackbody portion is at a much lower temperature as a result of the two-stage design. Consequently, reradiation losses are minimized, and efficiency is maximized.

Figure 17:
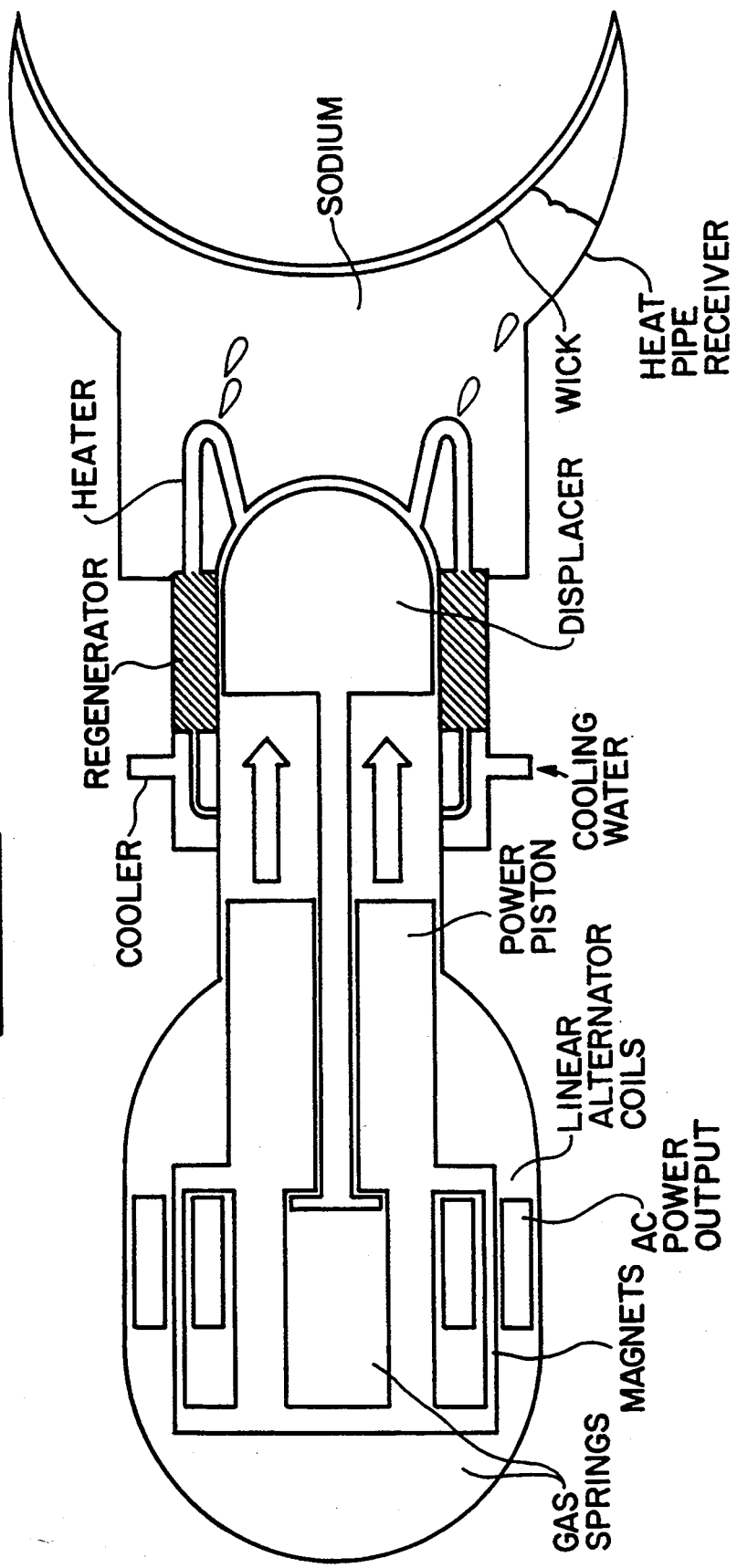
FIG. 17 illustrates the prior art "dish-Stirling" engine.

FIG. 17 illustrates the prior art Stirling cycle engine with the "heat pipe" solar receiver, as shown.

Figure 18:
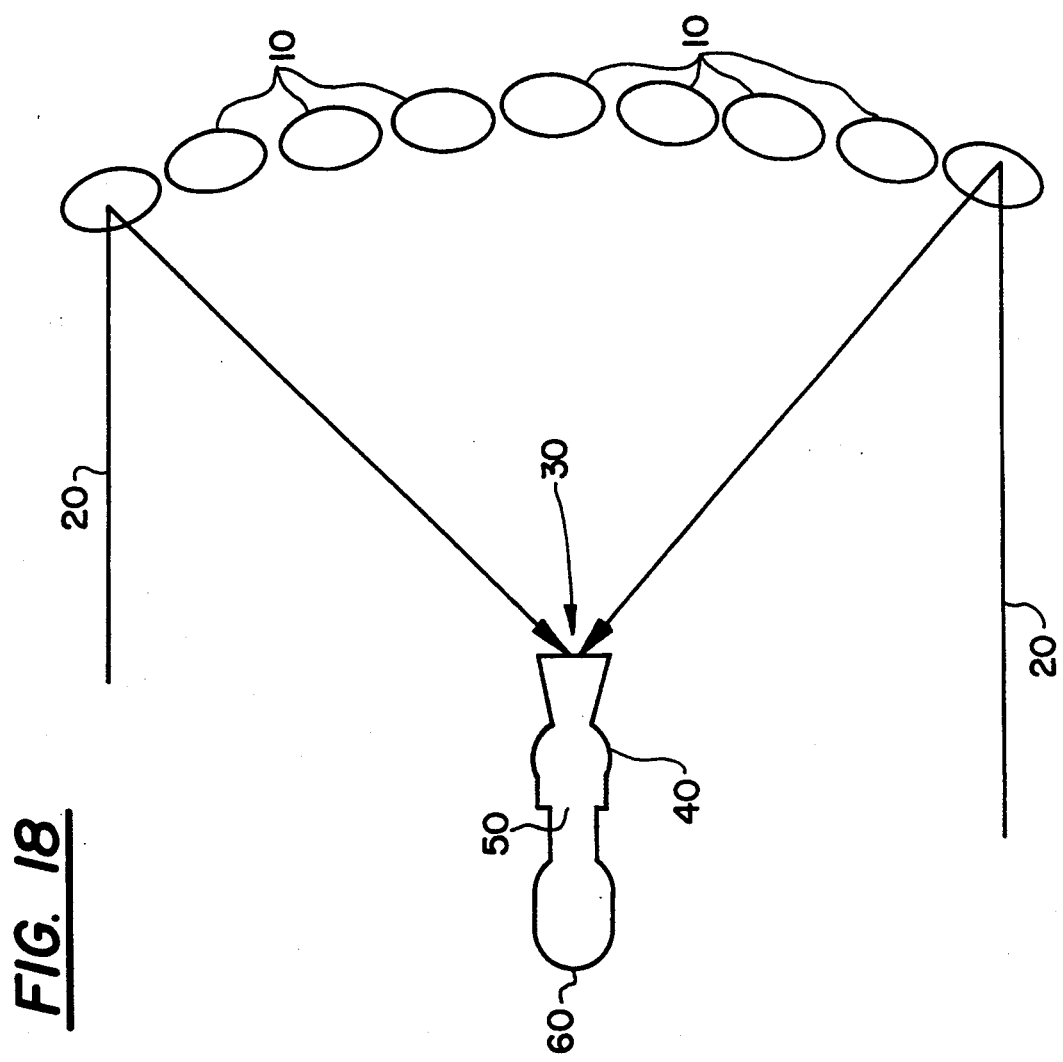
FIG. 18 is a schematic of a Stirling cycle engine using the non-driven-flow solar receiver invention.

FIG. 18 is a schematic showing the arrangement of concentrating dish 10 receiving incident solar radiation 20 and directing the solar radiation 20 into the nonimaging concentrator 30 which directs said solar radiation into dark gas receiver 40 (i.e., the containment vessel) which is attached to Stirling cycle engine 50 having alternator 60 as seen in FIG. 1.

Figure 19:
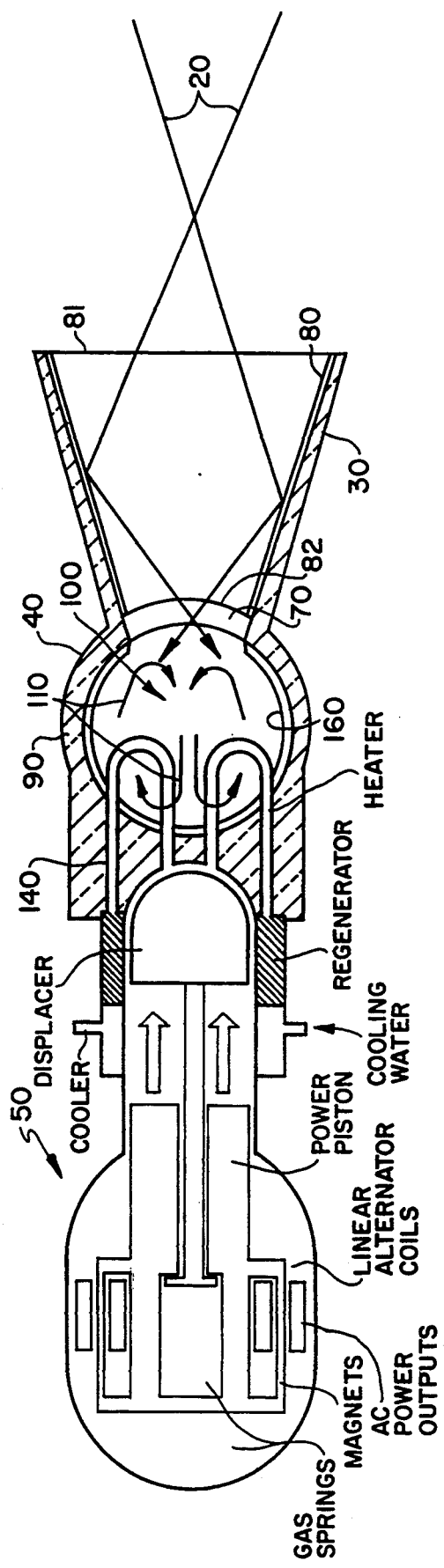
FIG. 19 is a detailed cross-sectional view of the non-driven-flow solar receiver invention especially adapted for use on a Stirling cycle engine.

FIG. 19 shows details of non-imaging concentrator 30 connected to Stirling cycle engine 50 to transmit concentrated incident solar radiation 20 into transport window 70 in containment vessel 40 by reflection from reflective surface 80. Containment vessel 40 has a receiving end 81 and transmitting end 82. The walls 90 of containment vessl 40 away from window 70 should be opaque. The opaque walls should have reflective surface 160. The working fluid 100 halogen, interhalogen and buffer inert gas fills containment vessel 40 and flows by natural convective currents 110 to circulate due to the thermal differences in containment vessel. Heater 120 is a conventional "U" shaped pipe heat exchanger and transfers heat from containment vessel 40 to activate Stirling cycle engine 50.

Figure 20:
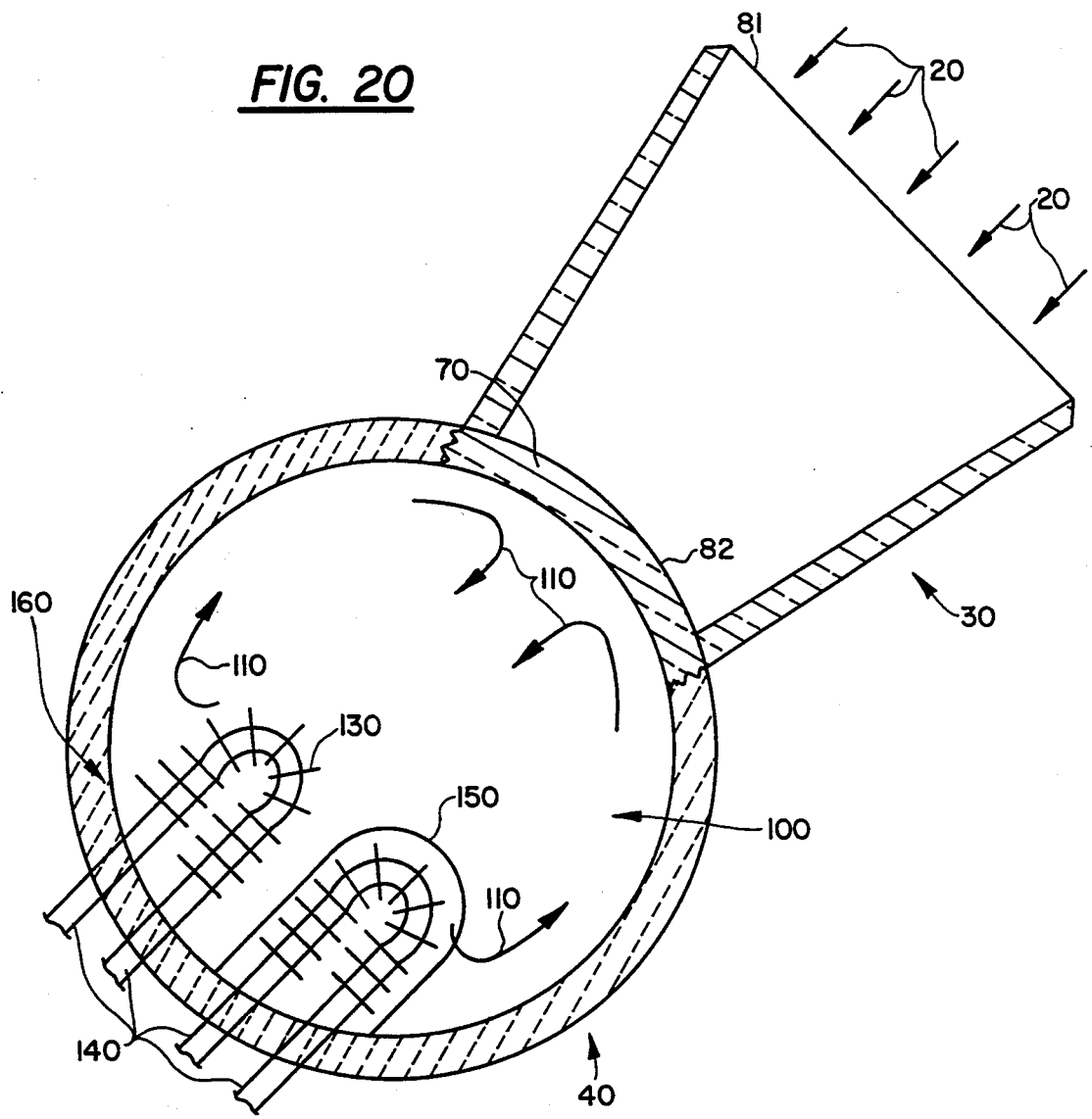
FIG. 20 is a schematic cross-sectional view showing additional embodiments of the non-driven-flow solar receiver for use with the Stirling cycle engine.

FIG. 20 shows the further embodiments of fins 130 and baffle 150 on heater 120 pipes 140, which can be employed to accommodate the infrared portion of the solar spectrum and aid in the heat transfer process.

The most recent embodiments shown in FIGS. 17-20, described above, improves the prior art "heat pipe" solar receiver, as follows.

FIG. 17 indicates the basic configuration of the prior art system using an assembly of stretched membrane mirrors to form a collector dish which concentrates incident solar radiation to a heat pipe receiver.

As designed, concentrated solar energy is deposited on a heat pipe receiver containing sodium, FIG. 17. The receiver walls are thin to allow thermal conduction to the sodium. In the receiver, the heated sodium vaporizes and condenses on heater head tubes, heating a gas which expands and displaces the piston of the engine. Since the hottest part of the system is the exterior receiver surface, the majority of deposited heat re-radiates to the cooler atmosphere instead of to the hotter sodium; hence efficiencies are below 30%.

Minor errors in solar tracking precision can allow concentrated solar energy to burn through the receiver, releasing the sodium. Sodium can ignite spontaneously with moisture, thus misalignment can not only shutdown the system, it can burn it up. However, these problems can be overcome by using the solar receiver of this invention described in FIGS. 18-20.

FIG. 18 indicates a Stirling cycle engine with a gas receiver coupled with a non-imagining concentrator applied to the prior art Stirling system. The non-imaging concentrator 30 eliminates hot spots and re-aligns any misdirected radiation from the dish collectors.

FIG. 18 indicates an opaque glass "eyeball" containment vessel 40 with a transparent window 70 and highly reflective inner surfaces 80 which would be filled with a mixture of halogens and a buffer gas 100 as described in U.S. Pat. No. 5,182,912 to provide a fluid for direct absorption of incident solar radiation and the subsequent heating of the Stirling heater tubes. Because the heater tubes 140 are at the top of the "eyeball" cavity, natural thermal convection would cause the hot gases to rise while the cooled gases would drop and be reheated as they circulate past the "window." The non-imagining concentrator would also have a reflective surface 160 to bounce incident radiation into the "eyeball's" cavity.

Halogen gases become thermally dissociated at sufficiently high temperatures into nonatomic radicals which are not strong light absorbers. Accordingly, as the temperature of the halogen absorbing gas rises there is an automatic shut off or bleaching of the absorber gas into a non-absorbing form, limiting any further temperature rise. The detailed performance of the halogen absorber gases in this connection is predictable from known properties and behaviors of the gases.

While the present invention has been disclosed in connection with the preferred embodiments thereof, it should be appreciated that there may be other embodiments of the present invention which fall within the spirit and scope of the present invention as defined by the appended claims.

What is claimed is:

1. A fluid absorption receiver for incident solar radiation especially adapted for use as the heat source for a Stirling cycle engine having means to receive heat, comprising a concentrating reflector dish which concentrates the incident solar radiation and reflects said solar radiation into a non-imaging concentrator having a receiving end and a transmitting end which is contiguous to a sealed containment vessel which has an outer wall which is transparent at least in the portion which is in alignment with said transmitting end of said non-imaging concentrator, said sealed containment vessel containing working fluid selected from the group consisting of absorber fluid of halogens and interhalogens and a buffer fluid which is in contact with said heat receiving means for absorbing and transferring heat to said Stirling cycle engine, said heat exchange means being sealably positioned to protrude into said sealed containment vessel, and said non-imaging concentrator having an inner reflective surface.

2. The receiver of claim 1 wherein said absorber is selcted from the group consisting of chlorine, bromine, iodine, and interhalogens of chlorine, bromine, and iodine.

3. The receiver of claim 1 wherein said buffer gas is selected from the group consisting of argon and helium.

4. The receiver of claim 3 wherein said heat receiving means is at least one pipe heat exchanger.

5. The receiver of claim 4 wherein said pipe has a fin attached.

6. The receiver of claim 4 wherein said pipe has a baffle attached.

7. A method of absorbing incident solar radiation comprising irradiating a working fluid consisting of halogens, interhalogens and an inert gas in a containment vessel having a transparent window and a means for transferring heat to a Stirling cycle engine by collecting said incident solar radiation with a solar concentrating dish and directing said solar radiation into a non-imaging concentrator which, in turn directs said concentrated solar radiation into said containment vessel through said window, thereby heating said working fluid to effect both thermal absorption and photolytic dissociation of said halogens and interhalogens, and transferring the chemical energy stored in said dissociated halogens and interhalogens into thermal energy by means of buffering with said inert gas, absorbing said thermal energy by said means for transferring heat to thereby transfer said thermal energy to said Stirling cycle engine as heat, while circulating said working fluid in said containment vessel by convective, differential thermal flow.

8. The method of claim 7 wherein said absorber is selected from the group consisting of chlorine, bromine, iodine, and interhalogens of chlorine, bromine, and iodine.

9. The method of claim 7 where said buffer gas is selected from the group consisting of argon and helium.

* * * * *